Patented Feb. 7, 1933

1,896,493

UNITED STATES PATENT OFFICE

HELMUTH MEIS, OF WIESDORF-ON-THE-RHINE, AND WILHELM KLEIN AND EDUARD TSCHUNKUR, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ARTIFICIAL RUBBER

No Drawing. Application filed July 7, 1928, Serial No. 291,131, and in Germany July 20, 1927.

The present invention relates to the manufacture of artificial rubber-like masses obtainable by polymerization of olefine hydrocarbons in aqueous suspension.

In accordance with the present invention the polymerization of olefine hydrocarbons to artificial rubber-like masses is considerably shortened, the formation of by-products is avoided and an almost quantitative yield is obtained by treating the hydrocarbons above mentioned, such as butadiene or analogues or homologues thereof, especially isoprene and 2.3-dimethylbutadiene, with very finely divided or colloidal heavy metal oxides, by which terms are meant the oxides of the metals having a specific gravity greater than five, such as manganese dioxide, lead dioxide, silver oxide, mercuric oxide, in the presence of water with or without the addition of emulsoid colloids, for example, albumen, soap, gelatine, dextrine and the like or other emulsifying agents of non-colloidal character, at room temperature or at temperatures usual in the polymerization process of olefine hydrocarbons in aqueous suspension. The whole of the hydrocarbons can thus be converted into artificial rubber-like masses within a few days.

Furthermore, the very finely divided or colloidal heavy metal oxides, which are obtainable by different methods in the presence of various protective colloids, either alone or in combination with other substances forming emulsions strongly promote the formation of the emulsions of the artificial rubber hydrocarbons with the water required for the polymerization, that is to say, they act simultaneously as emulsifiers and accelerators in the polymerization. This explains the surprisingly good yield in the polymerization in accordance with the present process.

When applying the heavy metal oxides in conjunction with other emulsifiers, polymerization accelerators and other additions, which term includes suitable inorganic as well as organic materials, for the purpose of modifying and improving the quality of the polymerization products, (such as for example, albumen, glue, viscous colloidal solutions of highly polymerized substances, dextrine, soap, saponin or salts of organic or inorganic origin), the heavy metal oxides greatly assist the action of such additions with the result, that in this case also the polymerization is complete in a very short time. Many additions which improve the quality of the polymerization products not infrequently retard the polymerization, in which case an addition of colloidal heavy metal oxides will complete the polymerization within a short time.

The quantities of the colloidal heavy metal oxides required for the polymerization are very small, amounts of ½% or more (calculated on the olefine hydrocarbon applied) being mentioned by way of example. The heavy metal oxides can also be produced from the corresponding metallic compounds directly in the polymerization mixture and in a form suitable for the polymerization by appropriate methods.

This new polymerization process thus supplies a method of polymerization of artificial rubber hydrocarbons to artificial rubber-like masses, which is simple in practice, cheap and very susceptible of combination and adaptation.

Our invention is illustrated by the following examples, to which, however, it is not limited:—

*Example 1.*—100 kgs. of butadiene are shaken in a pressure resisting shaking vessel with about 100 litres of a 1% aqueous colloidal solution of manganese dioxide at about 60° C. until polymerization is complete. The erythrene rubber thus obtained is rolled into sheets on a rolling machine mixed, with sulfur and vulcanized in the known manner. The vulcanization products are distinguished by high elasticity and strength.

*Example 2.*—100 kgs. of isoprene are treated with a solution of 0.1 kg. of colloidal manganese dioxide and 2.5 kgs. of egg albumen in 100 litres of water in a shaking apparatus as mentioned in Example 1 at 60° C. for several days. The polymerization is then complete. Reaction products of low molecular weight are not formed.

*Example 3.*—100 kgs. of butadiene are heated at 60° C. in a shaking autoclave with 100 litres of a 10% colloidal aqueous solution of manganese dioxide with the addition of 10 kgs. of soap until polymerization is complete.

*Example 4.*—100 kgs. of isoprene are treated with 50 litres of a 2% aqueous gelatine solution and 1 kg. of most finely ground lead dioxide in accordance with Example 2.

*Example 5.*—35 kgs. of isoprene are emulsified at ordinary temperature with 25 litres of a 5% aqueous egg albumen solution. 25 litres of a 1% aqueous potassium permanganate solution are then run in at this temperature, the temperature is raised with continuous shaking to about 60° C. and the polymerization mixture is left for several days at this temperature.

*Example 6.*—100 kgs. of isoprene are polymerized by treatment with 50 litres of a 5% albumen solution and 0.5 kg. of colloidal silver oxide in 50 litres of water in accordance with Example 2.

The polymerization in accordance with the above example can also be carried out with good results by shaking the appropriate initial compositions for a short time at room temperature and then leaving the respective emulsions to polymerize whilst standing at the higher temperature. An indifferent solvent may also be added in the polymerization.

The manner of working in accordance with the above examples can be varied and modified as regards the degree of dispersion of the metallic oxides, the emulsoid colloids and other factors, such as temperature, concentration and the like. The metallic oxides can be used with good success, either singly or in admixture with one another.

We claim:

1. Process for the manufacture of artificial rubber-like masses, which comprises treating a diolefine hydrocarbon, with a finely divided heavy metal oxide in aqueous suspension.

2. Process for the manufacture of artificial rubber-like masses, which comprises treating a diolefine hydrocarbon, with a finely divided heavy metal oxide in aqueous suspension, with the addition of a compound of the group consisting of emulsoid colloids and other emulsifying agents of non-colloidal character.

3. Process for the manufacture of artificial rubber-like masses, which comprises treating a compound of the group consisting of butadiene and its homologues with a finely divided heavy metal oxide in aqueous suspension.

4. Process for the manufacture of artificial rubber-like masses, which comprises treating a compound of the group consisting of butadiene and its homologues with a finely divided heavy metal oxide in aqueous suspension, with the addition of a compound of the group consisting of emulsoid colloids and other emulsifying agents of non-colloidal character.

5. Process for the manufacture of artificial rubber-like masses, which comprises treating a diolefine hydrocarbon, with a compound of the group consisting of manganese dioxide, lead dioxide, silver oxide and mercuric oxide in aqueous suspension.

6. Process for the manufacture of artificial rubber-like masses, which comprises treating a diolefine hydrocarbon, with a compound of the group consisting of manganese dioxide, lead dioxide, silver oxide, and mercuric oxide in aqueous suspension, with the addition of a compound of the group consisting of emulsoid colloids and other emulsifying agents of non-colloidal character.

7. Process for the manufacture of artificial rubber-like masses, which comprises treating a compound of the group consisting of butadiene and its homologues with a compound of the group consisting of manganese dioxide, lead dioxide, silver oxide and mercuric oxide in aqueous suspension.

8. Process for the manufacture of artificial rubber-like masses, which comprises treating a compound of the group consisting of butadiene and its homologues with a compound of the group consisting of manganese dioxide, lead dioxide, silver oxide and mercuric oxide in aqueous suspension, with the addition of a compound of the group consisting of emulsoid colloids and other emulsifying agents of non-colloidal character.

9. Artificial rubber-like masses, obtainable by polymerizing a diolefine hydrocarbon in aqueous suspension in the presence of a finely divided heavy metal oxide.

10. Artificial rubber-like masses, obtainable by polymerizing a compound of the group consisting of butadiene and its homologues in the presence of a finely divided heavy metal oxide.

11. Artificial rubber-like masses, obtainable by polymerizing a diolefine hydrocarbon in aqueous suspension in the presence of a finely divided compound of the group consisting of manganese dioxide, lead dioxide, silver oxide and mercuric oxide.

12. Artificial rubber-like masses, obtainable by polymerizing a compound of the group consisting of butadiene and its homologues in the presence of a finely divided compound of the group consisting of manganese dioxide, lead dioxide, silver oxide and mercuric oxide.

13. Process for the manufacture of artificial rubber, which comprises treating isoprene with colloidal manganese dioxide with the addition of egg albumen and water.

14. Artificial rubber obtainable by polymerizing isoprene in the presence of colloidal manganese dioxide.

15. Process for the manufacturing of artificial rubber-like masses, which comprises treating butadiene with colloidal manganese dioxide with the addition of water.

16. Process for the manufacture of artificial rubber-like masses, which comprises treating butadiene with colloidal manganese dioxide with the addition of soap and water.

17. Process for the manufacture of artificial rubber-like masses, which comprises treating a diolefine with about ½ to 1 percent, of the diolefine, of a heavy metal oxide in aqueous suspension.

18. Process for the manufacture of artificial rubber-like masses, which comprises treating a diolefine with about ½ to 1 percent, of the diolefine, of a finely divided heavy metal oxide, in aqueous suspension, with the addition of a compound selected from the class consisting of emulsoid colloids and other emulsifying agents of non-colloidal character.

In testimony whereof we have hereunto set our hands.

HELMUTH MEIS. [L. S.]
WILHELM KLEIN. [L. S.]
EDUARD TSCHUNKUR. [L. S.]